United States Patent [19]

Imanishi et al.

[11] 3,860,957

[45] Jan. 14, 1975

[54] MAGNETIC TAPE DUPLICATING APPARATUS

[75] Inventors: Kaoru Imanishi, Neyagawa; Hisayoshi Inoue, Kyoto, both of Japan

[73] Assignee: Matsushita Electric Industrial Co., Ltd., Osaka, Japan

[22] Filed: Sept. 17, 1973

[21] Appl. No.: 397,729

[30] Foreign Application Priority Data

| | | |
|---|---|---|
| Sept. 21, 1972 | Japan | 47-95362 |
| Dec. 29, 1972 | Japan | 47-4440 |
| Dec. 29, 1972 | Japan | 47-4442 |

[52] U.S. Cl. .................................... 360/17, 226/196

[51] Int. Cl. ............................................ G11b 5/86

[58] Field of Search ....... 179/100.25; 226/190, 191, 226/196; 242/192; 360/16, 17

[56] References Cited

UNITED STATES PATENTS

| | | | |
|---|---|---|---|
| 3,627,917 | 12/1971 | Sugaya et al. | 179/100.2 E |
| 3,676,612 | 7/1972 | Kobayashi et al. | 179/100.2 E |
| 3,703,612 | 11/1972 | Higashida et al. | 179/100.2 E |
| 3,707,608 | 12/1972 | Sugaya et al. | 179/100.2 E |

*Primary Examiner*—Stuart N. Hecker

*Attorney, Agent, or Firm*—Stevens, Davis, Miller & Mosher

[57] ABSTRACT

This invention contemplates a magnetic tape duplicating apparatus in which a recorded master tape is set in close contact with an unrecorded slave tape with their magnetic layer surfaces set in contact with each other and they are applied with heat or a magnetic field thereby to effect a duplication of information recorded in the master tape onto the unrecorded tape. Both of the tapes with their magnetic surfaces in contact with each other are wound on the same take-up reel and they are rewound under the application of heat or a magnetic field whereby the duplication is carried out with intimate contact, without causing a displacement therebetween, and a high speed duplication is attained.

7 Claims, 9 Drawing Figures

MAGNETIC TAPE DUPLICATING APPARATUS

This invention relates to a magnetic tape duplicating apparatus.

Conventionally, two types of magnetic tape duplicating device have been proposed as hereinafter detailed with reference to the figures in the accompanyng drawings. According to one type, a recorded master tape and an unrecorded slave tape which are wound on separate supply reels each independently driven by a motor (or motors) or the like are successively transported by means of separate take-up reels, and during the tape transportation, both the tapes undergo a positional regulation in the direction of their widths by a tape guide and their magnetic surfaces are brought close to each other. Under this situation, a magnetic field for duplication is applied to both the tapes. With this construction, however, as the tape running speed increases it becomes very difficult to achieve close contact between both of the tapes by means of the tape guide and this produces an air gap between the tapes; further, it is difficult to eliminate differences in speed between the two tapes. With a master tape recorded through the use of a video tape recorder, for example, while a duplication for recording signals of long wavelength such as audio signals and control signals can be done with normal efficiency, the duplication efficiency for recording signals of short wavelength such as video signals is considerably reduced. In addition, where a recording signal track is slightly inclined with respect to the tape transportation direction, the speed shift of the tape causes a track shift of the duplicated tape which impairs exchangeability.

The other conventional type is a collective taking-up magnetic tape duplicating device in which a bundle of a recorded master tape and an unrecorded slave tape with their magnetic surfaces in close contact with each other are driven by a rotating member and both the tapes are wound at the same time on a take-up reel which is urged against the rotating member by a spring or a like member. By applying a magnetic field necessary for duplication to both of the tapes wound on the take-up reel, duplication is effected. After completion of the duplication, the two tapes are rewound on separate supply reels. With a duplicating apparatus of this construction, the thickness of the leading ends of the two tapes establish stepped portions on the tapes wound on the take-up reel, which results in a local elongation of the magnetic tapes. Under this condition, duplication is done so that upon reproduction of the duplicated tape, signals duplicated at the stepped portions undergo a time modulation with the result that a periodic stripe-pattern of noise appears on the reproduced pictures thereby impairing the stability of pictures. Especially, in case of duplication with a magnetic tape of a cartridge VTR which is provided with a leader tape at its leading end for the sake of facilitating the tape mounting, since the leader tape has a far larger thickness than that of magnetic tape, occurrence of the stripe-pattern of noise phenomenon is enhanced. Since high density recording brings a gradual tendency to decreasing the thickness of magnetic tape and since it is becoming a practice to effect a duplication while the tapes are wound on a take-up reel, there may occur an increased so-called interlayer duplication where signals recorded in a master tape are duplicated onto a plurality of slave tapes. Consequently, this causes a problem that in signals of long wavelength, for example audio signals and control signals, are required to be retransferred by the application of a magnetic field or to be subjected to a recording by means of a recording head. As described above, a satisfactory tape duplicating apparatus cannot be realized.

This invention intends to eliminate various problems as mentioned above, and according to this invention there is provided a magnetic tape duplicating device wherein a recorded master tape and an unrecorded slave tape are wound on a single take-up reel, both of the tapes are subjected to a positional regulation in the direction of their widths to remove an air gap between the tapes and eliminate difference in speed, and the tapes are maintained under the previously mentioned condition during rewinding transportation to be applied with a magnetic field or heat so as to effect duplication.

An object of this invention is to provide an improved duplicating apparatus which has a sufficiently close contact between a master tape and a slave tape and dispenses with any displacement in speed between the two tapes.

The second object of this invention is to improve the stability or quality of duplicated signals by eliminating a loss in duplication for signals of long wavelength and of short wavelength, such as video signal.

The third object of this invention is to prevent unwanted abrasion of a duplication head.

The fourth object of this invention is to ensure duplication at high speed and enhance duplication efficiency.

Further objects and advantages of this invention will be fully understood from the following detailed description taken in conjunction with the accompanying drawings in which.

Figure 4A:
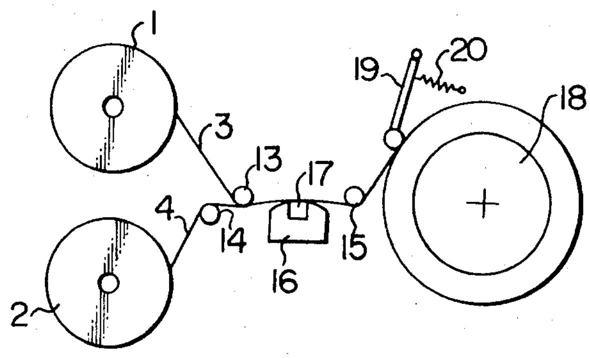

FIG. **4*a*** is a plan view of the first embodiment of the invention;

FIG. **4*b* is a side view, partially exaggerated, of the embodiment shown in FIG. 4*a*;**

Figure 5:
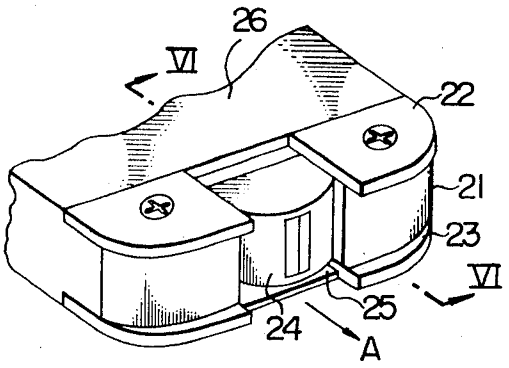

FIG. 5 is a perspective view, partially illustrated, of the embodiment shown in FIG. **4*a*;**

Figure 6:
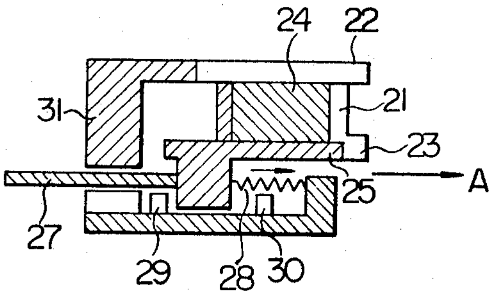
Figure 7:
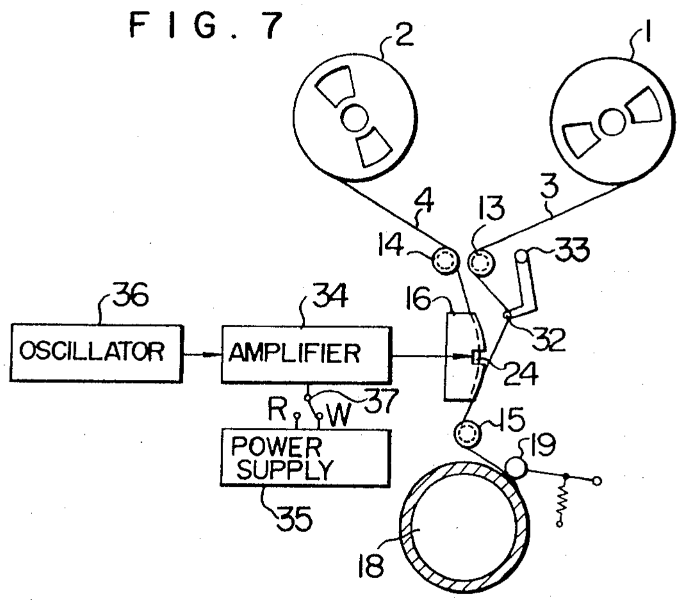
Figure 8:
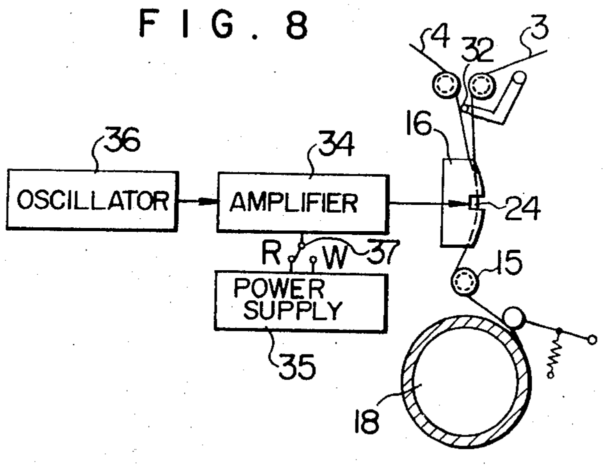

FIG. 6 is a longitudinal sectional view of FIG. 5 taken on line VI—VI;

FIG. 7 is a plan view for explaining a taking-up operation in accordance with the second embodiment of the invention; and FIG. 8 is a plan view for explaning a rewinding transportation operation of the embodiment shown in FIG. 7.

Figure 1:
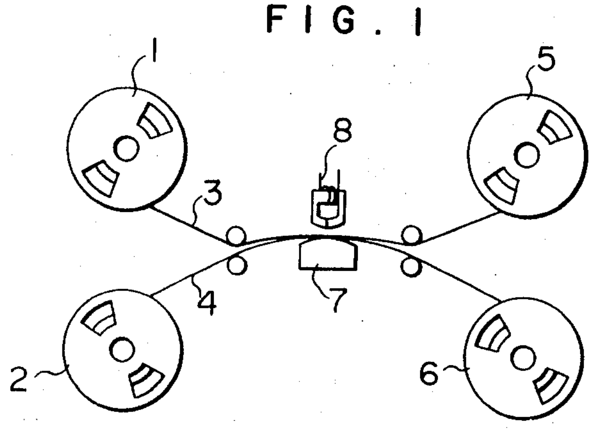
FIG. 1 is a plan view for explaining a prior art tape duplicating device.

FIG. 1 shows one example of a prior art tape duplicating device as described above. In the figure, reference numerals 1 and 2 designate separate tape supply reels. A recorded master tape 3 and an unrecorded slave tape 4 are successively driven by driving means (for example a motor, not shown) to be wound on separate take-up reels 5 and 6. During the tape transportation, both the tapes undergo a positional regulation in the direction of their widths by a tape guide 7 with their magnetic surfaces set in contact with each other and they are applied with a magnetic field for duplication by a magnetic field generator 8.

Figure 2:
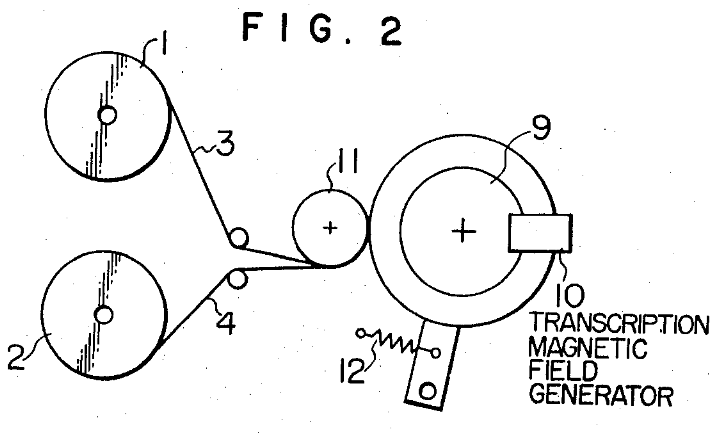
FIG. 2 is a plan view for explaining another type of tape duplicating device of the prior art.
Figure 3:
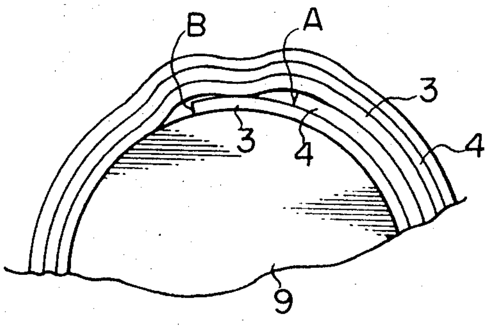
FIG. 3 is a plan view showing the status of tapes which are wound on a take-up reel in accordance with FIG. 2.

FIG. 2 shows another example of a prior art tape duplicating device. A recorded master tape 3 and an unrecorded slave tape 4 are driven by a rotary member 11 with their magnetic surfaces set in contact with each other and wound simultaneously on a take-up reel 9 which is urged against the rotary member 11 by a spring 12. By applying a magnetic field required for duplication to both of the tapes wound on the take-up reel 9 by means of a duplication magnetic field generator 10, duplication is effected. After completion of the duplication, the two tapes are rewound on separate supply reels 1 and 2. FIG. 3 shows the status of the tapes used with the device of FIG. 2 where thick leading ends of the two tapes establish stepped portions A and B on the tapes wound on the take-up reel, which results in a local elongation of the magnetic tapes. The prior art devices each have inherent disadvantages as mentioned above.

Figure 4B:
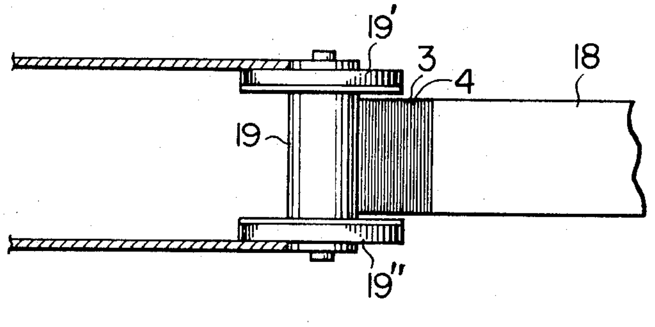

Turning now to FIG. 4, the first embodiment of this invention capable of obviating these prior art drawbacks will be explained. In the figure, numerals 1 and 2 designate supply reels driven by driving means and used for a recorded master tape and an unrecorded slave tape, respectively, numerals 13, 14 and 15 guide posts which regulate the positions of the running tapes, 16 a stationary guide having a convex surface for ensuring intimate contact between the tapes, 17 a duplication magnetic field generator, 18 a take-up reel and 19 a guide member for positionally regulating the tapes in the direction of the width to be wound on the take-up reel. The guide member 19 has upper and lower flanges 19' and 19'' as shown in FIG. 4*b* for effecting positional regulation of the tapes and is urged against the tapes wound on the take-up reel 18 by means of a spring 20. With this construction, the recorded master tape 3 and the slave tape 4 with their magnetic surfaces in intimate contact are wound simultaneously on the single take-up reel 18 at a high speed. The tapes are subjected to a positional regulation in the direction of their widths by means of a guide 19 while they are wound on the take-up reel. Upon rewinding transportation, both of the tapes are rewound from the single take-up reel 18 to separate supply reels 1 and 2 so that a difference in speed between the tapes is caused only by a difference in tape tension applied upon both tapes and thus the difference in speed is made very small. Under positional regulation by the stationary surface guide 16, both of the tapes released from the take-up reel 18 and placed in intimate contact with each other are applied with a magnetic field for duplication generated by the magnetic field generator 17. Since both of the tapes have been collectively wound on the take-up reel and are devoid of an air gap therebetween by the aid of the stationary guide surface 16 which is located extremely close to the take-up reel 18 and subjected to the positional regulation in the direction of their widths, the tapes which are maintained under the previous conditions run to the stationary guide 16 upon tape rewinding transportation. Accordingly, upon the application of the transfer magnetic field the tapes have no air gap therebetween. Namely the air gap between the tapes can be removed by providing the guide surface in contact with the tape with a suitable curvature. The stationary guide 16 serves to regulate the tapes in the direction of their width and remove any air gap between the tapes. Further tape transportation under this conditions can be effected. Under such conditions of the tapes, when a duplication is carried out, the magnetic field for duplication is applied exclusively to the master tape and the slave tape so that a local elongation due to the thickness of tape which is considered inherent to the collective taking-up of tapes is not caused and inter-layer duplications are avoided. Referring now to FIGS. 5 and 6, the stationary guide 16 will be explained. In the figures, numeral 21 designates a tape sliding surface, and 22 and 23 flanges for effecting the positional regulation in the direction of tape widths, which are secured to a guide body 31 by screws. Numeral 24 designates a magnetic field generator which is mounted to a movable base 25. The magnetic field generator can move within a groove or recessed portion 26 perpendicular to the tape sliding surface 21. One end of the movable base 25 is connected to a coupling rod 27 which is driven by a solenoid, for example. The other end is biased by a spring 28 in the direction A. Numerals 29 and 30 designate stoppers for controlling the stroke of the movable base 25. When the tapes are wound on the take-up reel, the movable base 25 is biased to the stopper 29 by the spring 28 and the magnetic field generator 24 mounted on the base 27 is positioned backward the tape sliding surface 21. When the tapes are rewound, the coupling rod 25 which receives a force against the spring 28 from a driving source (not shown) causes the movable base to move in the direction A until it reaches the stopper 30. Accordingly, the magnetic field generator 24 is positioned forward of the tape sliding surface 21 with a predetermined projection. The amount of projection can readily be adjusted by the stopper 30. With this construction, the magnetic field generator 24 is prevented from coming into contact with the tapes when the tapes are wound on the take-up reel, whereas the magnetic field generator 24 projects from the tape sliding surface only when the tapes are rewound, whereby the tapes are applied with the duplication magnetic field under the condition of sufficient contact therebetween and the magnetic field generator 24 is free from frequent contact with the tapes resulting in abrasion thereof, without impairing the contact between the two tapes.

Reference is now made to FIGS. 7 and 8 showing another embodiment of this invention. In this embodiment, the slave tape 4 is released from the supply reel 2 and conducted to the position regulating guide 14. Thereafter, the slave tape comes in contact with the sliding surface of the stationary guide 16 through a predetermined angle and passes through the position regulating guide 15 to the take-up reel 18 to be wound thereon concurrently with the recorded master tape 3. In like manner, the recorded master tape 3 is released from the supply reel 1 and conducted to the position regulating guide 13. However, when winding, the master tape is separated from the stationary guide 16 by a movable post 32 which is pivotally mounted to a shaft 33. The stationary guide 16 is provided with the magnetic field generator 24 to which the output of an oscillator circuit 36 is applied through an amplifier circuit 34. The amplifier 34 is connected to a power supply circuit 35 through a switch 37. More particularly, when winding, the switch 37 is transferred to a contact W and the magnetic field generator 24 receives a predetermined voltage from the power supply circuit 35 in order to apply a predetermined erasing magnetic field to the slave tape 4. Consequently, when the two tapes are wound on the take-up reel, the slave tape is subjected to erasing whereas the recorded master tape is free from influence of the erasing since it is remote from the magnetic field generator 24, as described above. FIG. 8 shows status of the movable post 32 and the recorded master tape upon rewinding transportation. Since the movable post 32 turns in the clockwise direction around the shaft 33, both of the tapes released from the take-up reel 18, under the condition of sufficient contact therebetween, are conducted by the position regulating guide 15 so as to slide on the stationary guide 16. When rewinding, the switch 37 is transferred to a contact R so that a voltage applied to the amplifier circuit 34 is varied to vary or increase the amplification degree thereof and the magnetic field generator 24 generates a predetermined magnetic field for duplication. In this manner, information of the master tape is duplicated onto the slave tape in accordance with a predetermined characteristics and both the tapes are rewound to the separate supply reels 1 and 2.

What we claim is:

1. A VTR magnetic tape duplicating apparatus for duplicating audio and video signals comprising a master tape supply reel on which a recorded master tape is wound; an unrecorded slave tape supply reel on which an unrecorded slave tape is wound, both said master and slave tapes being provided with leader tapes at their leading end portions which have widths and thicknesses different than the magnetic tape portions of their respective tapes; a take-up reel for winding up said tapes with their magnetic surfaces in contact with each other, no magnetic field being applied to said tapes when said tapes are wound on said take-up reel; means for rewinding both tapes wound on said take-up reel onto the respective supply reels at the same speed, said means including guide means for guiding both of said tapes with their magnetic surfaces in contact with each other over their predetermined travel path at least when both of said tapes are rewound from said take-up reel; and duplicating means for applying duplicating energy to both tapes in said predetermined travel path.

2. A magnetic tape duplicating apparatus according to claim 1 wherein said duplicating means comprises a magnetic field generator for generating said duplicating energy over the full width of both tapes.

3. A magnetic tape duplicating apparatus according to claim 1 wherein said guide means comprises a guide member having a tape sliding surface and flanges for effecting a positional regulation of both tapes such that magnetic surfaces of both of said tapes come into contact with each other, and said duplicating means is arranged so as to move in or out with respect to said sliding surface.

4. A magnetic tape duplicating apparatus according to claim 3 wherein said duplicating means is mounted on a movable base so as to be positioned backward of said tape sliding surface of said guide member when both of said tapes are wound and to project forward of said sliding surface when said tapes are rewound.

5. A magnetic tape duplicating apparatus according to claim 1 wherein said recorded master tape is transported to be wound on said take-up reel along a transportation path remote from said duplicating means.

6. A magnetic tape duplicating apparatus according to claim 5 wherein there is provided a switching circuit for enabling said duplicating means which comprises a magnetic field generator to apply an erasing magnetic field to a slave tape upon tape winding and a duplicating magnetic field upon tape rewinding.

7. A magnetic tape duplicating apparatus according to claim 6 wherein said switching circuit is switched by switching an output from an oscillator circuit of said magnetic field generator.

* * * * *